(12) United States Patent
Huang

(10) Patent No.: US 9,406,295 B2
(45) Date of Patent: Aug. 2, 2016

(54) APPARATUS AND METHOD FOR VOICE BASED USER ENROLLMENT WITH VIDEO ASSISTANCE

(71) Applicant: INTEL CORPORATION, Santa Clara, CA (US)

(72) Inventor: Jonathan J. Huang, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/365,013

(22) PCT Filed: Nov. 22, 2013

(86) PCT No.: PCT/US2013/071478
§ 371 (c)(1),
(2) Date: Jun. 12, 2014

(87) PCT Pub. No.: WO2015/076828
PCT Pub. Date: May 28, 2015

(65) Prior Publication Data
US 2015/0228278 A1 Aug. 13, 2015

(51) Int. Cl.
*G10L 15/25* (2013.01)
*G06K 9/00* (2006.01)
*G10L 17/04* (2013.01)

(52) U.S. Cl.
CPC ............ *G10L 15/25* (2013.01); *G06K 9/00228* (2013.01); *G06K 9/00268* (2013.01); *G10L 17/04* (2013.01); *G06K 9/00221* (2013.01)

(58) Field of Classification Search
None
See application file for complete search history.

(56) References Cited

U.S. PATENT DOCUMENTS

| | | | |
|---|---|---|---|
| 6,092,192 A | 7/2000 | Kanevsky et al. | |
| 6,219,639 B1 * | 4/2001 | Bakis et al. | 704/246 |
| 6,219,640 B1 | 4/2001 | Basu et al. | |
| 8,542,879 B1 * | 9/2013 | Nechyba et al. | 382/103 |
| 9,263,044 B1 * | 2/2016 | Cassidy | G06K 9/00 |
| 2008/0167868 A1 * | 7/2008 | Kanevsky et al. | 704/233 |

(Continued)

FOREIGN PATENT DOCUMENTS

WO WO 2012-128382 A1 9/2012

OTHER PUBLICATIONS

Pelecanos et al, Addressing channel mismatch through speaker discriminative transforms, 2006, in Speaker and Language Recognition Workshop, IEEE Odyssey, pp. 1-6.*

(Continued)

*Primary Examiner* — Bhavesh Mehta
*Assistant Examiner* — David F Dunphy
(74) *Attorney, Agent, or Firm* — Schwabe, Williamson & Wyatt, P.C.

(57) ABSTRACT

Embodiments of apparatus and methods for voice based user enrollment with video assistance are described. In embodiments, an apparatus may include a face recognition module to identify a user from a first plurality of images and a lip motion detection module to detect the lip motion of the user from a second plurality of images. The apparatus may also include a recording module to activate a recording of the user. The apparatus may further include a user enrollment module, coupled with the recording module and the lip motion detection module, to establish a speaker model of the user based at least in part on the recording and the lip motion of the user. Other embodiments may be described and/or claimed.

17 Claims, 5 Drawing Sheets

(56) References Cited

U.S. PATENT DOCUMENTS

| | | |
|---|---|---|
| 2011/0071830 A1 | 3/2011 | Kim et al. |
| 2013/0163781 A1* | 6/2013 | Thyssen ............... H04R 3/007 381/94.3 |
| 2013/0196715 A1* | 8/2013 | Hansson ............... H04M 1/19 455/563 |

OTHER PUBLICATIONS

International Search Report and Written Opinion mailed Aug. 27, 2014 for International Application No. PCT/US2013/071478, 13 pages.

International Preliminary Report on Patentability mailed Jun. 2, 2016 for International Application No. PCT/US2013/071478, 10 pages.

\* cited by examiner

APPARATUS AND METHOD FOR VOICE BASED USER ENROLLMENT WITH VIDEO ASSISTANCE

CROSS REFERENCE TO RELATED APPLICATIONS

The present application is a national phase entry under 35 U.S.C. §371 of International Application No. PCT/US2013/071478, filed Nov. 22, 2013, entitled "APPARATUS AND METHOD FOR VOICE BASED USER ENROLLMENT WITH VIDEO ASSISTANCE", which designated, among the various States, the United States of America. The Specification of the PCT/US2013/071478 Application is hereby incorporated by reference.

FIELD OF THE INVENTION

The present disclosure relates generally to the technical field of computing, and more particularly but not exclusively, to apparatuses and methods for voice based user enrollment with video assistance.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

Speaker recognition is the process of identifying or verifying a person based, e.g., on the voice biometrics of the person, and the process may also be called as voice recognition or speaker verification. Speaker recognition typically has two phases, an enrollment phase, and a verification phase. During the enrollment phase, the speaker's voice is recorded and analyzed. Subsequently a speaker model (or voiceprint, template) may be built to characterize the voice biometrics of the person. During verification, a speech sample (or utterance) may be compared against one or more previously created speaker models. As an example, the speech sample may be compared against multiple speaker models for identification purpose. As another example, the speech sample may be compared against one speaker model for verification purpose with a presumptive identification of the speaker.

Speaker recognition systems generally fall into two categories: text-dependent speaker verification (TD-SV) and text-independent speaker verification (TI-SV). TD-SV generally requires the speaker utter the same text for enrollment and verification. Compared to TD-SV, TI-SV systems generally require very little if any cooperation by the speaker because there is no constraint on the speech content, and the speaker may speak freely to a TI-SV system. Advantageously, for TI-SV systems, the text used during enrollment and verification can be different. However, TI-SV systems generally require a long enrollment session lasting at least several minutes to achieve reasonably acceptable error rate at verification sessions. Requiring the users to explicitly read or talk for long time for the sole purpose of enabling voice biometrics enrollment may lead to poor user experience in general. Furthermore, explicit enrollment may be unsuitable for cases where the enrollment should happen without the user's knowledge, such as in forensic applications or stealthy operations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
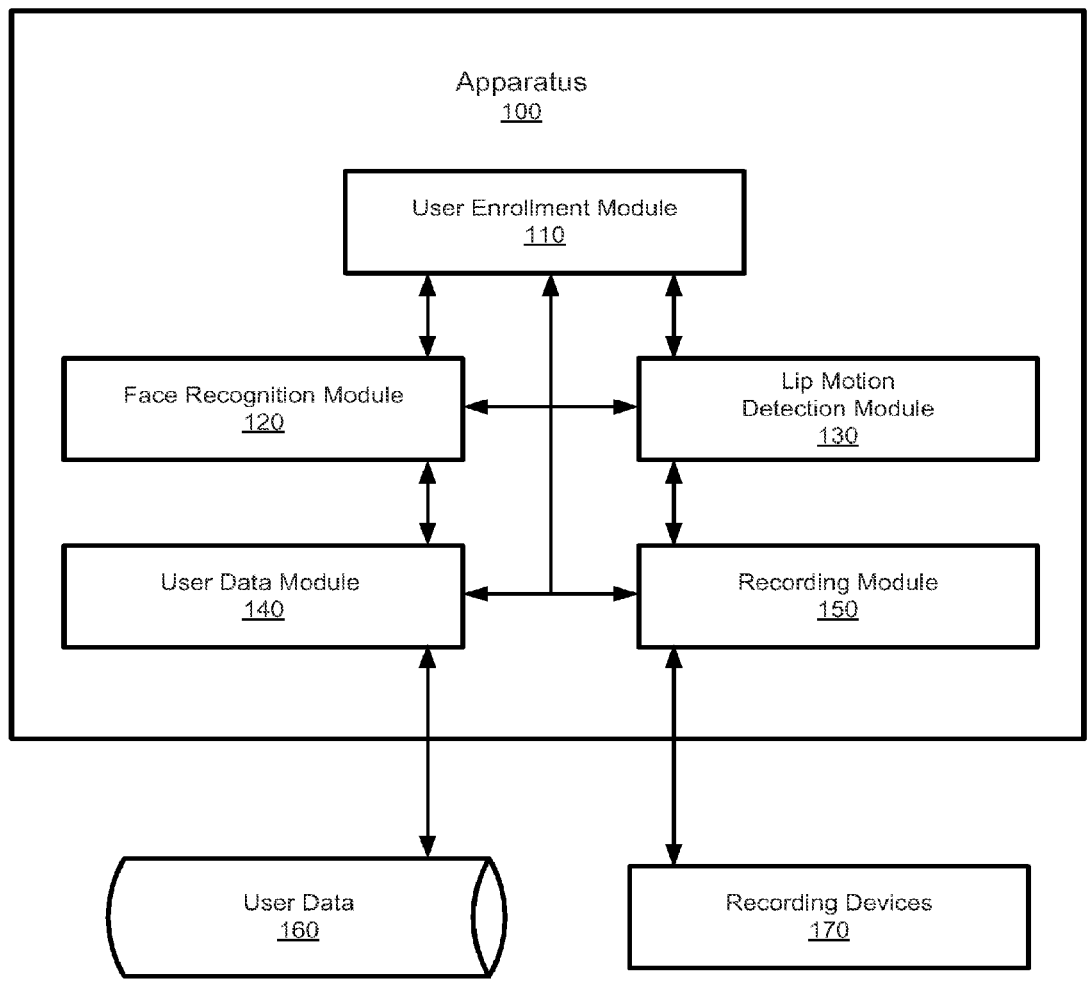
FIG. 1 is a schematic diagram illustrating an example implementation of an apparatus for voice based user enrollment with video assistance, incorporating aspects of the present disclosure, in accordance with various embodiments.

Embodiments of apparatus and methods for voice based user enrollment with video assistance are described herein. In embodiments, an apparatus may include a face recognition module to identify a user and a lip motion detection module to detect the lip motion of the user from one or more images. The apparatus may also include a recording module to activate a recording of the user. The apparatus may further include a user enrollment module, coupled with the recording module and the lip motion detection module, to establish a speaker model of the user based at least in part on the recording and the lip motion of the user. Therefore, the apparatus may be configured to facilitate speaker enrollment during normal conversations. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure or characteristic described in connection with the embodiment is included in at least one embodiment of the invention. The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software. In embodiments, the term "interface" may refer to a point of interaction with software or computer hardware, including peripheral devices such as a computer monitor, a networking device, a camera, a video recorder, etc.

Referring now to FIG. 1, an example implementation of an apparatus for voice based user enrollment with video assistance, in accordance with various embodiments, is illustrated. In embodiments, apparatus 100 may be a mobile device coupled with one or more recording devices 170. In embodiments, apparatus 100 may be a distributed system with various components or subsystems distributed at various wearable, mobile, or stationary devices. In embodiments, apparatus 100 may be a mobile device or coupled with one or more wearable devices equipped with various sensors that may capture a wide range of information of users, e.g., voice samples, image samples, video samples, olfactory samples, etc. Furthermore, apparatus 100 may utilize the sensor data and other information for voice based user enrollment with video assistance.

In embodiments, apparatus 100 may include recording module 150 configured to control one or more recording devices 170 coupled with apparatus 100. Apparatus 100 may be configured to receive data (e.g., video, audio, etc.) from the one or more recording devices 170 via recording module 150. In embodiments, apparatus 100 may include face recognition module 120 configured to automatically identifying or verifying a person based on digital images or video frames from a video source, e.g., by comparing selected facial features from the digital image and a facial database. Recording module 150 may be coupled with face recognition module 120 to provide digital images or video frames to be used for face recognition. Meanwhile, face recognition module 120 may be coupled with user data module 140, which may be configured to manage user data 160. Thus, face recognition module 120 may be used for identifying or verifying a person, e.g., by comparing images or video frames against with a face profile retrievable from user data 160.

In embodiments, apparatus 100 may include lip motion detection module 130 configured to detect lip motion of a user, e.g., by detecting opening and closing actions of lips. Recording module 150 may be coupled with lip motion detection module 130 to provide video frames to be used for lip motion detection. In embodiments, lip motion detection module 130 may be coupled with user enrollment module 110 configured for voice based user enrollment for speaker recognition.

User enrollment module 110 may be configured to receive data from recording module 150, including audio and/or video data. The data from recording module 150 may be associated with a user whose identity may be identified by face recognition module 120. Furthermore, enrollment module 110 may be configured to establish a speaker model of the user based at least in part on the identity of the user, the lip motion of the user detected via lip motion detection module 130, and the data received from recording module 150.

In embodiments, recording module 150 may be configured to communicate with various sensors or recording devices with sensors. Thus, recording module 150 may include or be coupled to a broad range of wired or wireless interfaces, including but are not limited, $I^2C$ bus, universal serial bus (USB), Bluetooth®, wireless network interface controller (WNIC), and the like. Recording module 150 may be configured to communicate with an array of sensors, distributed in multiple recording devices 170, including, but not limited to, cameras for recording images, audio and/or video recorders for recording sound and/or video, etc.

In embodiments, recording devices 170 may include devices registered to participate in the enrollment of a target speaker. Such devices may have a clear view of the user, such as a laptop, a tablet, or a smartphone having a user-facing camera. Such devices may also be set-top box in the user's living room, or head worn devices worn by the user's friends or other family members. In some embodiments, recording devices 170 may include dedicated video recording devices and/or dedicated audio recording devices. In some embodiments, recording devices 170 may include multi-functional devices configured to record both video and audio. In some embodiments, data from each recording device may follow different processing paths in apparatus 100. As an example, video data may be routed to face recognition module 120 and/or lip motion detection module 130, and audio data may be routed to user enrollment module 110.

In embodiments, recording devices 170 may include multiple devices to record simultaneously so that the channel variability in hardware, mood, acoustic channel (noise and reverberation), and/or other factors may be captured. In embodiments, recording module 150 may be configured to collaborate with user enrollment module 110 in controlling recording devices 170, such as sending operation commands to recording devices 170 to start, stop, or pause operations for some sensors, to adjust sensitivity of some sensors, to adjust recording directions/angles, and/or to control other sensor operations.

In embodiments, user enrollment module 110 may utilize existing speaker models of the user or historical speech data of the user stored in user data 160. In embodiments, user data module 140 may be configured to respond to queries issued from user enrollment module 110, including commands to store, retrieve, query, and manipulate user data managed by user data module 140. User data module 140 may be coupled with (or comprise) one or more database management systems (DBMS) which allow the definition, creation, querying, update, and administration of databases. User data module 140 may use any one of the database standards, such as structured query language (SQL), open database connectivity (ODBC), Java database connectivity (JDBC), or any other database standard to work with more than one database. User data module 140 may be configured to store user data locally in apparatus 100, remotely in a remote device, or in the cloud.

In embodiments, apparatus 100 may be implemented differently as depicted in FIG. 1. As an example, lip motion detection module 130 may be implemented as an integrated subsystem of face recognition module 120. As another example, face recognition module 120 and/or lip motion detection module 130 may be combined with user enrollment module 110 to form a comprehensive user enrollment module. In embodiments, components depicted in FIG. 1 may have direct or indirect connection not shown in FIG. 1. As an example, user enrollment module 110 may be directly connected with user data 160 and/or recording devices.

In embodiments, some or all components of apparatus 100 may be implemented in hardware or software, or combination thereof, as well as spread across any number of different devices or networks. Some or all components of apparatus 100 may be local or remote to the target speaker for voice based user enrollment for speaker recognition. In embodiments, as described earlier, some or all components of apparatus 100 may be, directly or indirectly, in communication with various sensors within recording devices. In embodiments, some or all components of apparatus 100 may be in communication with each other and/or various recording devices via one or more communication modules (not shown in FIG. 1) with any suitable communication protocols.

Enhanced with the present disclosure, an apparatus may be configured for voice based user enrollment with video assistance, e.g., partially based on the audio and video data the apparatus may receive from recording devices 170. Enhanced with the present disclosure, an apparatus may capture ad hoc enrollment speech during normal conversations without requiring an explicit recording for speaker verification enrollment. Enhanced with the present disclosure, an apparatus may repeat this convenient and expedite process for capturing enrollment speech as often as needed in various conditions to improve system accuracy for voice based user enrollment. Resultantly, user experience may be greatly enhanced and speaker enrollment may be permitted to take place whenever a user is engaged in normal conversations.

Figure 2:
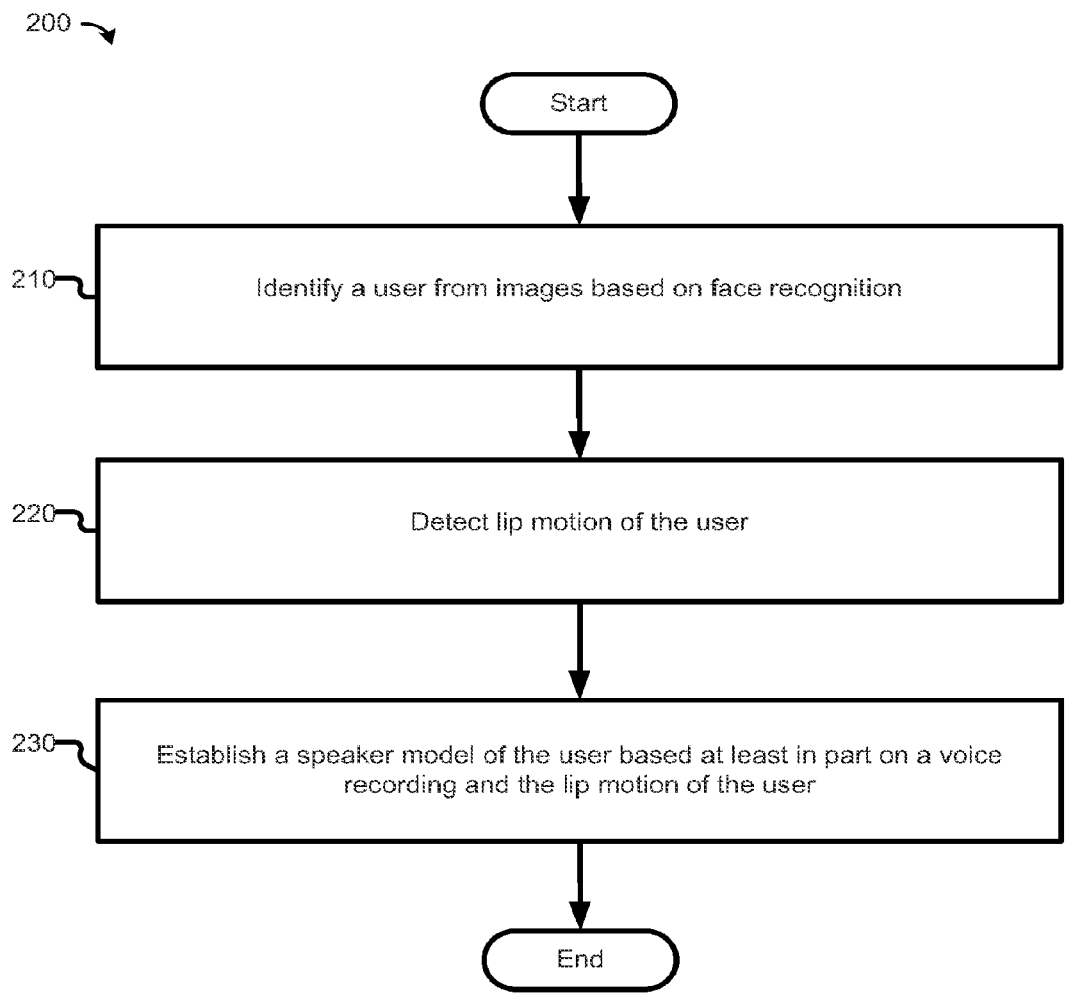
FIG. 2 is a flow diagram of an example process for voice based user enrollment with video assistance, which may be practiced by an example apparatus, incorporating aspects of the present disclosure, in accordance with various embodiments.

Referring now to FIG. 2, a flow diagram of an example process 200 for voice based user enrollment with video assistance is illustrated. Process 200 may be practiced by an example apparatus, incorporating aspects of the present disclosure, in accordance with various embodiments. The process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for voice based user enrollment with video assistance. As such, process 200 may be performed by a computing device, e.g., apparatus 100 in connection with FIG. 1, to implement one or more embodiments of the present disclosure.

In embodiments, the process may begin at block 210, where a user may be identified based on face recognition technologies, e.g., by face recognition module 120. As discussed in connection with FIG. 1, in embodiments, face recognition module 120 may receive images or video frames from various recording devices 170 via recording module 150. Meanwhile, face recognition module 120 may have access to a user face profile or a facial database having one or more reference face images of users as well as identity information of the users. As an example, face images of a user may be collected before a voice based user enrollment session, e.g., utilizing the user's online presence such as her headshot posted in her website or her images posted in various social networks. As another example, identify information of the user may be input into the speaker verification system by the user or the system administrator, e.g., during the initial registration process.

In embodiments, face recognition module 120 may compare selected facial features from received images or video frames against the face profile or the facial database, thus to identify the presence of a particular user. In embodiments, distinguishing geometric features of one or more faces of a user, e.g., the relative position, size, and/or shape of the eyes, nose, cheekbones, and jaw, may be analyzed and used to search for images with matching features. In embodiments, photometric values may be distilled from a face image and compared with templates to eliminate variances before searching images with similar values. In embodiments, 3D sensors from recording devices 170 may be used to capture identifying information of the shape of a face, such as the contour of the eye sockets, nose, and chin. Such identifying information may be used for three-dimensional face recognition. In embodiments, skin texture analysis may map the unique lines and patterns on a person's skin into a mathematical space for face recognition. In embodiments, face recognition module 120 may additionally use other biometrics such as fingerprint or eye iris as alternative or ancillary measures to identify a user.

In embodiments, when a user is successfully recognized by face recognition module 120, recording module 150 may start a new recording session for the user. Similarly, when a user is detected by face recognition module 120 for having left the scene, recording module 150 may stop the current recording session for the user. In embodiments, recording module 150 may generate an audible or visible indication for active recording of a user. As an example, recording module 150 may generate an audible indication such as a beep when there is a transition or change happened in a recording device. As another example, recording module 150 may generate a visible indication such as enabling an LED light on apparatus when there is a transition or change happened in a recording device. In embodiments, information detected by face recognition module 120, such as user identity, may be stored as metadata to markup data recorded by recording devices 170.

Next, at block 220, lip motion of the user may be detected, e.g., by lip motion detection module 130. As discussed in connection with FIG. 1, in embodiments, lip motion detection module 130 may receive images or video frames from various recording devices 170 via recording module 150. In embodiments, lip motion detection module 130 may initially receive the same images or video frames as face recognition module 120. Face recognition module 120 may stop receiving and processing the images or video frames when a target user has been identified, while lip motion detection module 130 may continue to detect lip motion of the user.

In embodiments, lip motion detection module 130 may use various techniques to detect and identify lip motion of a user. In some embodiments, lip motion may be simply characterized as mouth open or close where the status of mouth open may indicate an ongoing speech utterance. In some embodiments, advanced algorithms may be utilized for tracking lip movement and recognizing lip gestures. As an example, lip image may be segmented by transforming RGB (red, green, blue) color space into HSV (hue, saturation, value) color space, or a similar color space. As another example, lip segmentation may utilize a lip shape model based on deformable templates, active contour models, active shape models, or other models where a set of feature points may be used to approximate the lip contours.

In embodiments, lip motion detected by lip motion detection module 130 may induce recording module 150 to issue commands to control the current recording session for the user, such as start, pause, or stop the recording session. In embodiments, lip motion may resemble or at least indicate speaker utterance. Therefore, a session of recording may be partitioned into at least two kinds of segments, namely, segments of audio associated with the user and segments of audio not associated with the user. In embodiments, information detected by lip motion detection module 130, such as lip motion or lip gesture, may be stored as metadata to markup data recorded by recording devices 170.

Next, at block 230, a speaker model of the user may be established based at least in part on an audio or voice recording and the lip motion of the user, e.g., by user enrollment module 110. In embodiments, a number of features of the voice of a speaker may be extracted to form a speaker model, voiceprint, or template. User enrollment module 110 may be configured for feature extraction, such as Mel-frequency cepstral coefficients, perceptual linear prediction cepstral coefficients, power-normalized cepstral coefficients, and other features. Various technologies may be used by user enrollment module 110 in building the speaker model, such as Gaussian mixture models, vector quantization, neural networks, support vector machines, i-vectors, decision trees, etc.

In embodiments, multiple recording devices may be simultaneously used in recording a session. In embodiments, the recorded data from the multiple recording devices may be utilized by user enrollment module 110 in building the speaker model. As an example, both a primary recording device and an auxiliary recording device may be used in a user enrollment session. The primary or auxiliary recording device may be integrated into apparatus 100, may be a physically separate device (such as a wrist worn or head worn computing device) with no view of the user, or may be a video camera also capturing the user in video. The voice recording channels from the primary recording device and the auxiliary recording device may provide channel variations derived from different reverberation, noise, sensitivity, microphone, and hardware configurations, etc. Channel variations or variability may assist user enrollment module 110 to build speaker models with increased robustness during verification, such as mitigating performance degradation caused by cross channel verification where enrollment and verification commonly use different recording channels. In embodiments, multiple auxiliary recording devices may be used to further improve the robustness of the speaker model. In some embodiments, recording devices, particularly the user's devices (smartphones, tablets, wearable computing devices, etc.), may all participate in speaker recognition with speaker models built based at least in part on audio data recorded from the same recording device.

In embodiments, the speaker model of the user may be built based at least in part on one or more existing speaker models of the user or historical speech data of the user. The user's speaker model may be automatically adapted or improved based on new user enrollment sessions, thus mitigate performance degradation caused by changes in the user's voice, such as due to aging or illness. Enhanced by the present disclosure, user experience for speaker recognition may be greatly improved by capturing enrollment data during normal conversations, and this process may be repeated as often as needed in various conditions to improve system accuracy. In embodiments, the speaker model and any associated data may be stored at user data 160 by user data module 140, so that they may be provided in response to a subsequent speaker verification request.

Figure 3:
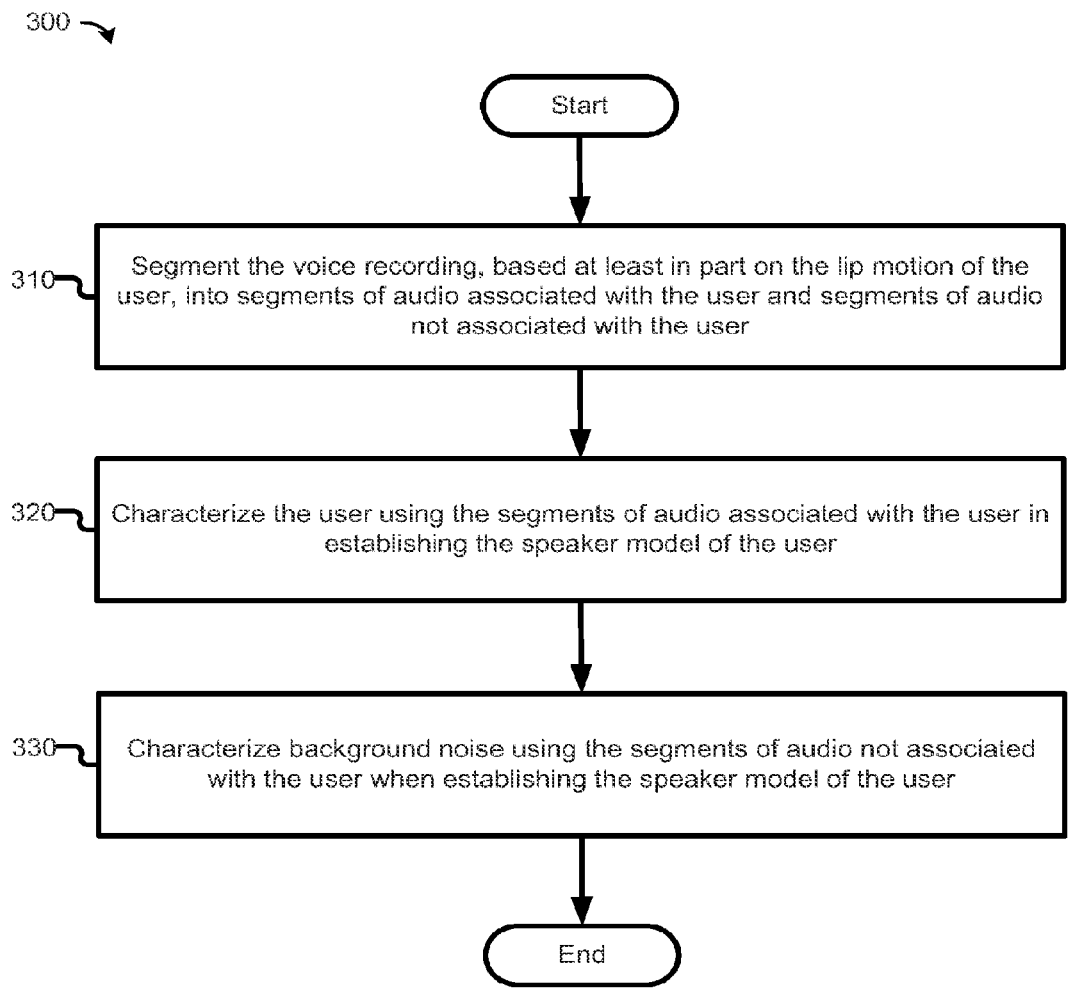
FIG. 3 is a flow diagram of an example process for establishing a speaker model of a user, which may be practiced by an example apparatus, incorporating aspects of the present disclosure, in accordance with various embodiments.

Referring now to FIG. 3, it is a flow diagram of an example process 300 for establishing a speaker model of a user, which may be practiced by an example apparatus in accordance with various embodiments. As shown, process 300 may be performed by apparatus 100 to implement one or more embodiments of the present disclosure. In embodiments, process 300 may be performed in reference to block 230 in FIG. 2. In embodiments, various blocks in FIG. 3 may be combined or arranged in any suitable order, e.g., according to the particular embodiment of apparatus 100 to conduct voice based user enrollment with video assistance.

In embodiments, the process may begin at block 310, where the recording may be segmented or marked, based at least in part on the lip motion of the user, into segments of audio associated with the user and segments of audio not associated with the user, e.g., by user enrollment module 110. In embodiments, a markup language may be used for marking or tagging the data received from recording devices. In embodiments, the markup language may be used in describing the relationship between the lip motion of a user and the recorded audio and/or video data. In embodiments, the lip motion information as well as other contextual information may be saved together with the recorded audio and/or video data or in a separate location. In embodiments, the relationship information between the lip motion of a user and the recorded audio and/or video data may be saved together with the recorded audio and/or video data or saved in a separate database. In embodiments, the relationship information between the lip motion of a user and the recorded audio and/or video data may be may be searched, e.g., by user enrollment module 110 or user data module 140.

Next, at block 320, the user, specifically the voice of the user, may be characterized using the segments of audio associated with the user in establishing the speaker model of the user, e.g., by user enrollment module 110. Various technologies, as discussed in connection with block 230, may be used in characterizing the voice of the user. Next, at block 330, background noise may be characterized using the segments of audio not associated with the user when establishing the speaker model of the user, e.g., by user enrollment module 110. Ambient noise may distort the voice samples in reflecting the true characteristics of one's voice. The segments of audio not associated with the user may serve as good samples in characterizing ambient noise. Subsequently, noise reduction technologies or algorithms may be employed in building more accurate speaker models.

Figure 4:
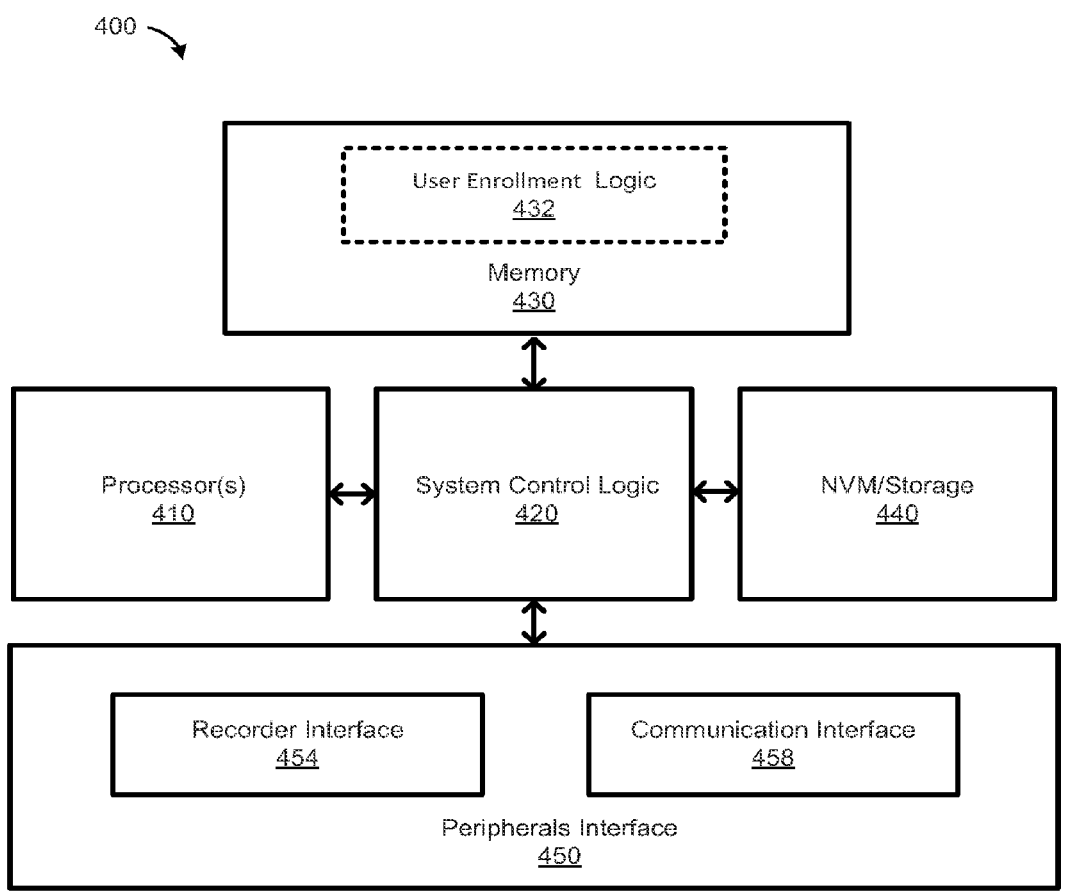
FIG. 4 illustrates an example computing device suitable for practicing the disclosed embodiments, in accordance with various embodiments.

FIG. 4 illustrates an embodiment of a computing device 400 suitable for practicing embodiments of the present disclosure. As illustrated, computing device 400 may include system control logic 420 coupled to one or more processor(s) 410, to system memory 430, to non-volatile memory (NVM)/storage 440, and to one or more peripherals interface 450. In various embodiments, the one or more processors 410 may include a processor core.

In embodiments, peripherals interface 450 may include recording interface 454, which may be similar to earlier described recording module 150 and be used as an interface for computing device 400 to communicate with a variety of recording devices as previously discussed in connection with FIG. 1. Communication interface 458 within peripherals interface 450 may provide an interface for computing device 400 to communicate over one or more network(s) and/or with any other suitable device. Communication interface 458 may include any suitable hardware and/or firmware, such as a network adapter, one or more antennas, wireless interface(s), and so forth. In various embodiments, communication interface 458 may include an interface for computing device 400 to use near field communication (NFC), optical communications, or other similar technologies to communicate directly (e.g., without an intermediary) with another device. In various embodiments, communication interface 458 may interoperate with radio communications technologies such as, for example, Wideband Code Division Multiple Access (WCDMA), Global System for Mobile communications (GSM), Long Term Evolution (LTE), WiFi, Bluetooth®, Zigbee, and the like.

In some embodiments, system control logic 420 may include any suitable interface controllers to provide for any suitable interface to the processor(s) 410 and/or to any suitable device or component in communication with system control logic 420. System control logic 420 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 420 may include one or more memory controller(s) (not shown) to provide an interface to system memory 430. System memory 430 may be used to load and store data and/or instructions, for example, for computing device 400. System memory 430 may include any suitable volatile memory, such as suitable dynamic random access memory (DRAM), for example.

In some embodiments, system control logic 420 may include one or more input/output (I/O) controller(s) (not shown) to provide an interface to NVM/storage 440 and peripherals interface 450. NVM/storage 440 may be used to store data and/or instructions, for example. NVM/storage 440 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 440 may include a storage resource that is physically part of a device on which computing device 400 is installed or it may be accessible by, but not necessarily a part of, computing device 400. For example, NVM/storage 440 may be accessed by computing device 400 over a network via communication interface 458.

In embodiments, system memory 430, NVM/storage 440, and system control logic 420 may include, in particular, temporal and persistent copies of voice based user enrollment logic 432. User enrollment logic 432 may include instructions that, when executed by at least one of the processor(s) 410, result in computing device 400 to perform voiced based user enrollment with video assistance, such as, but not limited to, processes 200 and 300. In embodiments, user enrollment logic 432 may include instructions that, when executed by at least one of the processor(s) 410, result in computing device 400 to perform various functions associated with user enrollment module 110, face recognition module 120, lip motion detection module 130, user data module 140, and recording module 150, in connection with FIG. 1.

In some embodiments, at least one of the processor(s) 410 may be packaged together with memory having system control logic 420 and/or voice based user enrollment logic 432. In some embodiments, at least one of the processor(s) 410 may be packaged together with memory having system control logic 420 and/or user enrollment logic 432 to form a System in Package (SiP). In some embodiments, at least one of the processor(s) 410 may be integrated on the same die with memory having system control logic 420 and/or voice based user enrollment logic 432. In some embodiments, at least one of the processor(s) 410 may be integrated on the same die with memory having system control logic 420 and/or user enrollment logic 432 to form a System on Chip (SoC).

Depending on which modules of apparatus 100 in connection with FIG. 1 are hosted by computing device 400, the capabilities and/or performance characteristics of processors 410, system memory 430, and so forth, may vary. In various implementations, computing device 400 may be a wearable computing device, a smartphone, a tablet, a mobile computing device, a server, etc., enhanced with the teachings of the present disclosure. In embodiments, the placement of the different modules in FIG. 4 and/or how they are clustered with other modules may be different from what is illustrated in FIG. 4. As an example, recording interface 454 may be implemented in memory 430, together with voice based user enrollment logic 432. As another example, at least part of the functions performed by user enrollment logic 432 may be implemented elsewhere. For instance, face recognition or lip motion detection functions may be implemented as independent modules in peripherals interface 450 or directly embedded into processor(s) 410, to expedite the processing of access control and/or enhance security.

Figure 5:
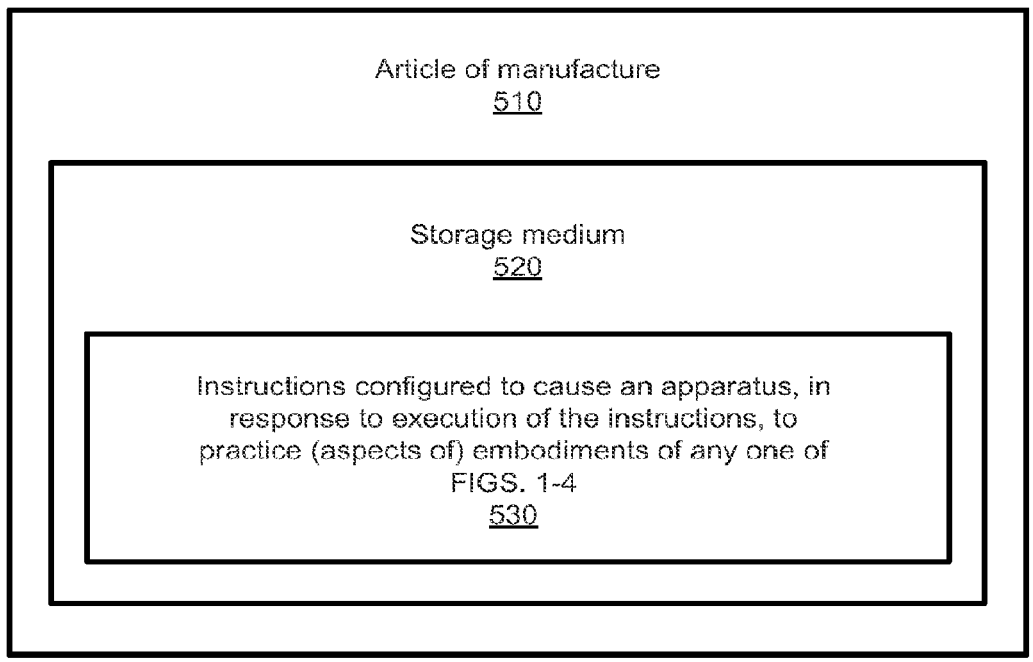
FIG. 5 illustrates an article of manufacture having programming instructions, incorporating aspects of the present disclosure, in accordance with various embodiments.

FIG. 5 illustrates an article of manufacture 510 having programming instructions, incorporating aspects of the present disclosure, in accordance with various embodiments. In various embodiments, an article of manufacture may be employed to implement various embodiments of the present disclosure. As shown, the article of manufacture 510 may include a computer-readable storage medium 520 where instructions 530 configured to practice embodiments of or aspects of embodiments of any one of the processes described herein. The storage medium 520 may represent a broad range of persistent storage media known in the art, including but not limited to flash memory, dynamic random access memory, static random access memory, an optical disk, a magnetic disk, etc. Instructions 530 may enable an apparatus, in response to their execution by the apparatus, to perform various operations described herein. For example, storage medium 520 may include instructions 530 configured to cause an apparatus, e.g., apparatus 100, to practice some or all aspects of voice based user enrollment with video assistance of the process 200 of FIG. 2 or process 300 of FIG. 3, in accordance with embodiments of the present disclosure. In embodiments, computer-readable storage medium 520 may include one or more computer-readable non-transitory storage medium. In other embodiments, computer-readable storage medium 520 may be transitory, such as signals, encoded with instructions 530.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. For example, as noted earlier, while for ease of understanding the disclosure hereinabove primarily described an apparatus with separate modules for face recognition and lip motion detection to demonstrate various embodiments, this disclosure may be embodied in an apparatus without a face recognition module when user identification may be established with other means or procedures. Therefore, it is manifestly intended that embodiments described herein be limited only by the claims.

The following paragraphs describe examples of various embodiments.

Example 1 is an apparatus for voice based user enrollment, which may include a face recognition module to identify a user from a first plurality of images and a lip motion detection module to detect lip motion of the user from a second plurality of images. The apparatus may also include a recording module, coupled with the face recognition module or the lip motion detection module, to activate a recording of the user. Furthermore, the apparatus may include a user enrollment module, coupled with the recording module or the lip motion detection module, to establish a speaker model of the user based at least in part on the recording and the lip motion of the user.

Example 2 may include the subject matter of Example 1, and may further include a user data module coupled with the user enrollment module to store one or more speaker models of the user, and to provide the one or more speaker models of the user in response to a subsequent speaker verification request.

Example 3 may include the subject matter of Examples 1-2, and further specifies that the recording module may be configured to further provide an audible or visible indication for active recording of the user.

Example 4 may include the subject matter of Examples 1-3, and further specifies that the face recognition module may access a user face profile having one or more reference face images of the user, and identity information of the user.

Example 5 may include the subject matter of Examples 1-4, and further specifies that at least initial ones of the first and second plurality of images may be the same images, and the face recognition module and the lip detection module may receive the same initial plurality of images from one or more video recording devices.

Example 6 may include the subject matter of Examples 1-5, and further specifies that the user enrollment module may establish the speaker model further based on an existing speaker model of the user or historical speech data of the user.

Example 7 may include the subject matter of Examples 1-6, and further specifies that the recording module may include a first channel to record from a first recording device and a second channel to record from a second recording device with channel variability between the recording from the first recording device and the recording from the second recording device.

Example 8 may include the subject matter of Example 7, and further specifies that the user enrollment module may use both the first channel recording and the second channel recording to establish the speaker model of the user.

Example 9 may include the subject matter of Examples 1-8, and further specifies that the user enrollment module may segment the recording, based at least in part on the lip motion of the user, into segments of audio associated with the user, and segments of audio not associated with the user.

Example 10 may include the subject matter of Example 9, and further specifies that the user enrollment module may use the segments of audio associated with the user in characterizing voice of the user to establish the speaker model of the user.

Example 11 may include the subject matter of Example 9 or 10, and further specifies that the user enrollment module may use the segments of audio not associated with the user to characterize background noise when establishing the speaker model of the user.

Example 12 is a method for voice based user enrollment, which may include identifying, by a computing system, a user from a first plurality of images; detecting, by the computing system, a lip motion of the user, based at least in part on a second plurality of images; and establishing, by the computing system, a speaker model of the user based at least in part on an identity of the user, detected lip motion, and a voice recording of the user to enroll the user.

Example 13 may include the subject matter of Example 12, and may further include storing, by the computing system, the speaker model in a data storage; and providing, by the computing system, the speaker model in response to a subsequent speaker verification request.

Example 14 may include the subject matter of Example 12 or 13, and may further include providing, by the computing system, an audible or visible indication for activating recording of the user to create the voice recording.

Example 15 may include the subject matter of Examples 12-14, and may further include accessing, by the computing device, a user face profile having one or more reference face images of the user, and identity information of the user.

Example 16 may include the subject matter of Examples 12-15, and may further include receiving, by the computing system, the first plurality of images from one or more video recording devices and identify the user based on face recognition.

Example 17 may include the subject matter of Examples 12-16, and may further include establishing, by the computing system, the speaker model of the user further based at least in part on an existing speaker model of the user or historical speech data of the user.

Example 18 may include the subject matter of Examples 12-17, and may further include recording, by the computing system, the voice recording of the user from a first recording device in a first channel recording and from a second recording device in a second channel recording with channel variability between the first channel recording and the second channel recording.

Example 19 may include the subject matter of Example 18, and may further include establishing, by the computing system, the speaker model of the user further based at least in part on both the first channel recording and the second channel recording.

Example 20 may include the subject matter of Examples 12-19, and may further include segmenting the voice recording, by the computing system, based at least in part on lip motion of the user, into segments of audio associated with the user and segments of audio not associated with the user.

Example 21 may include the subject matter of Example 20, and may further include characterizing, by the computing system, the user using the segments of audio associated with the user in establishing the speaker model of the user; and characterizing, by the computing system, background noise using the segments of audio not associated with the user when establishing the speaker model of the user.

Example 22 is a computer-readable storage medium having stored therein instructions configured to cause a device, in response to execution of the instructions by the device, to practice the subject matter of any one of Examples 12-21. The storage medium may be non-transient.

Example 23 is an apparatus for voice based user enrollment, which may include means for means for identifying, by a computing system, a user from a first plurality of images; means for detecting, by the computing system, lip motion of the user, based at least in part on a second plurality of images; and means for establishing, by the computing device, a speaker model of the user based at least in part on an identity of the user, detected lip motion, and a voice recording of the user.

Example 24 may include the subject matter of Example 23, and may further include means for recording, by the computing system, the voice recording of the user from a first recording device in a first channel recording and from a second recording device in a second channel recording with channel variability between the first channel recording and the second channel recording; and means for establishing, by the computing system, the speaker model of the user further based at least in part on both the first channel recording and the second channel recording.

Example 25 may include the subject matter of Example 23 or 24, and may further include means for segmenting, by the computing system, the voice recording of the user, based at least in part on the detected lip motion of the user, into segments of audio associated with the user and segments of audio not associated with the user.

Example 26 may include the subject matter of Example 25, and may further include means for characterizing, by the computing system, voice of the user using the segments of audio associated with the user to establish the speaker model of the user; and means for characterizing, by the computing system, background noise using the segments of audio not associated with the user to establish the speaker model of the user.

What is claimed is:

1. An apparatus, comprising:
one or more processors;
a face recognition module to be operated by the one or more processors to identify a user from a first plurality of images;
a lip motion detection module to be operated by the one or more processors to detect lip motion of the user from a second plurality of images;
a recording module to be operated by the one or more processors to cooperate with the face recognition module and the lip motion detection module to activate a recording of the user; and
a user enrollment module to be operated by the one or more processors to cooperate with the recording module and the lip motion detection module to establish a new text-independent speaker model of the user based at least in part on the recording;
wherein in establishing the new text-independent speaker model of the user, the user enrollment module is to:
segment the recording, based at least in part on the lip motion of the user, into segments of audio associated with the user, and segments of audio not associated with the user;
use the segments of audio not associated with the user to characterize background noise, and the segments of audio associated with the user in characterizing a voice of the user for the new text-independent speaker model of the user; and
apply noise reduction, in view of the background noise characterized based on the segments of audio not associated with the user, when characterizing the voice of the user based on the segments of audio associated with the user.

2. The apparatus according to claim 1, further comprising:
a user data module coupled with the user enrollment module to store one or more speaker models of the user, and to provide the one or more speaker models of the user in response to a subsequent speaker verification request.

3. The apparatus according to claim 1, wherein the recording module is to further provide an audible or visible indication for active recording of the user.

4. The apparatus according to claim 1, wherein the face recognition module is to access a user face profile having one or more reference face images of the user, and identity information of the user.

5. The apparatus according to claim 1, wherein at least initial ones of the first and second plurality of images are same images, and wherein the face recognition module and the lip motion detection module are to receive the same initial plurality of images from one or more video recording devices.

6. The apparatus according to claim 1, wherein the user enrollment module is to establish the speaker model further based on an existing speaker model of the user or historical speech data of the user.

7. The apparatus according to claim 1, wherein the recording module comprises a first channel to record from a first recording device and a second channel to, while recording the first channel, simultaneously record from a second recording device with channel variability between the recording from the first recording device and the recording from the second recording device.

8. The apparatus according to claim 7, wherein the user enrollment module is to use both the first channel recording and the second channel recording to establish the speaker model of the user.

9. At least one non-transitory machine readable storage medium having a plurality of instructions to cause an apparatus, in response to execution of the plurality of instructions by the apparatus, to:
identify a user from a first plurality of images;
detect a lip motion of the user, based at least in part on a second plurality of images; and
establish a new text-independent speaker model of the user based at least in part on an identity of the user, detected lip motion, and a voice recording of the user to enroll the user;
wherein to establish the new text-independent speaker model of the user includes,
segmentation of the voice recording, based at least in part on lip motion of the user, into segments of audio associated with the user and segments of audio not associated with the user;
characterize background noise using the segments of audio not associated with the user, and characterize a voice of the user using the segments of audio associated with the user for the new text-independent speaker model of the user; and
application of noise reduction, in view of the background noise characterized using the segments of audio not associated with the user, when characterizing the voice of the user using the segments of audio associated with the user.

10. The storage medium of claim 9, the instructions to further cause the apparatus to:
store the new text-independent speaker model in a data storage; and
provide the speaker model in response to a subsequent speaker verification request.

11. The storage medium of claim 9, the instructions to further cause the apparatus to:
provide an audible or visible indication for activating recording of the user to create the voice recording.

12. The storage medium of claim 9, the instructions to further cause the apparatus to:
access a user face profile having one or more reference face images of the user, and identity information of the user.

13. The storage medium of claim 9, the instructions to further cause the apparatus to:
receive the first plurality of images from one or more video recording devices and identify the user based on face recognition.

14. The storage medium of claim 9, the instructions to further cause the apparatus to:
simultaneously record the voice recording of the user from a first recording device in a first channel recording and from a second recording device in a second channel recording with channel variability between the first channel recording and the second channel recording.

15. The storage medium of claim 14, the instructions to further cause the apparatus to:
establish the new text-independent speaker model of the user further based at least in part on both the first channel recording and the second channel recording.

16. A method, comprising:
identifying, by a computing system, a user from a first plurality of images;
detecting, by the computing system, lip motion of the user, based at least in part on a second plurality of images;
establishing, by the computing device, a new text-independent speaker model of the user based at least in part on an identity of the user, detected lip motion, and a voice recording of the user;
wherein establishing a speaker model of the user includes,
segmenting the voice recording, based at least in part on lip motion of the user, into segments of audio associated with the user and segments of audio not associated with the user;
characterizing background noise using the segments of audio not associated with the user, and characterizing a voice of the user using the segments of audio associated with the user for the new text-independent speaker model of the user; and
applying noise reduction, in view of the background noise characterized using the segments of audio not associated with the user, when characterizing the voice of the user using the segments of audio associated with the user.

17. The method according to claim 16, further comprising:
simultaneously recording the voice recording of the user from a first recording device in a first channel recording and from a second recording device in a second channel recording with channel variability between the first channel recording and the second channel recording; and
establishing the speaker model of the user further based at least in part on both the first channel recording and the second channel recording.

* * * * *